(12) United States Patent
Doubrava et al.

(10) Patent No.: US 6,773,485 B2
(45) Date of Patent: *Aug. 10, 2004

(54) METHOD FOR RECOVERING CATALYTIC METALS USING A POROUS METAL FILTER

(75) Inventors: Jeffrey Doubrava, Cutchogue, NY (US); Anthony Gallegos, St. Charles, IL (US); Eric G. Lundquist, North Wales, PA (US); James C. Bohling, Lansdale, PA (US); Richard F. Staniunas, Northboro, MA (US)

(73) Assignee: Shipley Company, L.L.C., Marlborough, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/301,367
(22) Filed: Nov. 21, 2002
(65) Prior Publication Data
US 2004/0003681 A1 Jan. 8, 2004

Related U.S. Application Data
(60) Provisional application No. 60/332,124, filed on Nov. 21, 2001.

(51) Int. Cl.[7] ............................. C22B 3/22; C22B 11/00
(52) U.S. Cl. ............................. 75/426; 75/427; 75/428; 75/429; 75/430; 75/432; 75/714; 75/743; 75/744
(58) Field of Search ................ 75/426, 427, 428, 75/429, 430, 432, 714, 743, 744

(56) References Cited
U.S. PATENT DOCUMENTS

| | | |
|---|---|---|
| 3,011,920 A | 12/1961 | Shipley, Jr. |
| 3,532,518 A | 10/1970 | D'Ottavio et al. |
| 4,020,009 A | 4/1977 | Gulla |
| 4,085,066 A | 4/1978 | Gulla |

(List continued on next page.)

FOREIGN PATENT DOCUMENTS

CZ    224 741    8/1985

OTHER PUBLICATIONS

"Reclamation of Palladium from Colloidal Seeder Solutions", Research Disclosure Jun. 1990, No. 31448, Disclosed Anonymously, pp. 493.

Ezawa et al., "Extraction and Recovery of Precious Metals from Plating Solutions Using Molecular Recognition Technology", IBC Advanced Technologies, Inc., Apr. 2000, pp. 1–15.

Fang et al., "Improvements in the Recovery of Palladium From Reprocessing Waste of Spent Nuclear Fuel Reported Earlier", Journal of Radioanalytical and Nuclear Chemistry, Articles, vol. 189, No. 1 (1995), pp. 59–63.

Article entitled "Precious Metals, Platinum Group Can be Recovered With Hydrometallurgy", American Metal Market, Jul. 6, 1983, pp. 13.

(List continued on next page.)

*Primary Examiner*—Melvyn Andrews
(74) *Attorney, Agent, or Firm*—John J. Piskorski

(57) ABSTRACT

A method for recovering catalytic metals from fluid compositions containing catalytic metal colloids. Fluid compositions such as aqueous rinse solutions or dragout baths containing catalytic metal colloids are passed through a porous metal filter that entraps the catalytic metal colloids. The catalytic metal colloids have a high affinity for the porous metal filter in contrast to other components of the fluids. The other components of the fluids pass through the porous metal filter while the catalytic metal colloids concentrate on the porous metal filter. The catalytic metal colloids that are captured on the porous metal filter are removed from the filter by backwashing the filter with a gas and/or a liquid. The backwashing forces the catalytic metal colloids off of the porous metal filter and through a solids discharge valve and into a solids collection container. The method is economically efficient with high catalytic metal recovery and is environmentally friendly.

18 Claims, 2 Drawing Sheets

U.S. PATENT DOCUMENTS

| | | |
|---|---|---|
| 4,120,819 A | 10/1978 | Small |
| 4,164,481 A | 8/1979 | Ma et al. |
| 4,223,173 A | 9/1980 | Manziek |
| 4,227,899 A | 10/1980 | Meny et al. |
| 4,240,909 A | 12/1980 | Manziek |
| 4,260,493 A | 4/1981 | Kretas et al. |
| 4,261,738 A | 4/1981 | Valentine et al. |
| 4,311,811 A | 1/1982 | Manziek |
| 4,311,812 A | 1/1982 | Manziek |
| 4,355,140 A | 10/1982 | Manziek |
| 4,410,665 A | 10/1983 | Manziek |
| 4,420,401 A | 12/1983 | Kretas et al. |
| 4,435,258 A | 3/1984 | Melka, Jr. et al. |
| 4,593,016 A | 6/1986 | Amelio et al. |
| 5,009,965 A | 4/1991 | Feldstein |
| 5,047,563 A | 9/1991 | Denton et al. |
| 5,114,447 A | 5/1992 | Davis |
| 5,213,895 A | 5/1993 | Hirai et al. |
| 5,247,078 A | 9/1993 | Champion et al. |
| 5,302,183 A | 4/1994 | De Boer et al. |
| 5,304,233 A | 4/1994 | Awadalla et al. |
| 5,914,195 A | 6/1999 | Hori et al. |
| 5,917,066 A | 6/1999 | Eisenmann et al. |
| 5,937,263 A | 8/1999 | Eisenmann et al. |
| 6,080,219 A | 6/2000 | Jha et al. |
| 6,147,225 A | 11/2000 | Gaboury et al. |
| 6,169,045 B1 | 1/2001 | Pike et al. |
| 6,267,871 B1 * | 7/2001 | Weakly et al. ............... 205/742 |

OTHER PUBLICATIONS

Draye et al., "Selective Extraction of Palladium from Acidic Nitrate Solutions with Thiamacrocycles–synergized dinonylnaphthalenesulfonic Acid Systems", Journal of Radioanalytical and Nuclear Chemistry, vol. 220, No. 1 (1997), pp. 105–107.

Guyon et al., "Lipophilic Polythiamacrocycles as Palladium Extracting Agents", Tetrahedron vol. 51, No. 14, pp. 4065–4074, 1995.

Letowski et al., "Platinum and Palladium Recovery From Spent Catalysts by Aluminum Chloride Leaching", Proceedings of the International Symposium on Recycle and Secondary Recovery Metals and the Fall Extractive and Process Metallurgy Meeting Sponsored by the Physical Chemistry Committee of the Metallurgical Society of AIME held in Fort Lauderdale, Florida, Dec. 1–4, 1985, pp. 735–745.

Saito et al., "Synthesis of Thiacrown Ether Carboxylic Acids and Their Characteristics as Extractants for Metal Ions", Analytica Chimica Acta 299 (1994), pp. 137–144.

Godlewska–Zylkiewicz et al., "Ion–Exchange Preconcentration and Separation of Trace Amounts of Platinum and Palladium", Analytical Letters, 33(13), pp. 2805–2820 (2000).

* cited by examiner

METHOD FOR RECOVERING CATALYTIC METALS USING A POROUS METAL FILTER

This application claims the benefit of U.S. Provisional Application No. 60/332,124 filed Nov. 21, 2001.

BACKGROUND OF THE INVENTION

The present invention is directed to a method of recovering catalytic metal. More specifically, the present invention is directed to a method of recovering catalytic metals from fluid compositions containing catalytic metal colloids using a porous metal filter.

Electroless metal deposition refers to the chemical deposition of a metal on a conductive, non-conductive, or semi-conductive substrate in the absence of an external electric source. Electroless deposition is used for many purposes, for example, in the manufacture of printed circuit boards where, in one method, an electroless metal, often copper, is deposited on a dielectric substrate either as a uniform surface coating or in a predetermined pattern. The initial electroless copper deposit is thin and may be further built up by electroplating or may be deposited directly to fill thickness.

The substrate over which an electroless metal deposit is formed is often a plastic panel which may have a metal foil such as copper laminated to one or both of its surfaces, for example, with adhesive, to form a metal clad substrate. Where both surfaces of the substrate are to be used, connections are provided therebetween by means of holes through the panel at appropriate locations. The walls of the holes are made conductive with electroless coating.

The electroless deposition of a metal on either a metallic or non-metallic substrate requires pretreatment or sensitization of the substrate to render it catalytic to reception of a metal deposit. Catalytic metal colloids are often used as the sensitizer or seeder to prepare the substrate for reception of the metal.

Catalytic metal colloids are dispersions formed by the admixture of a catalytic metal ion and a non-catalytic metal ion in an amount in excess of the catalytic metal ion. Such dispersions are often formed in acidic solutions but also may be formed in alkaline solutions. Suitable catalytic metal ions are well known in the art. Examples of highly desirable catalytic metal ions are the noble metal ions of gold, platinum and palladium. An example of a suitable non-catalytic metal ion used to form the metal colloid is stannous metal. Colloidal baths or solutions may contain tin in amounts of from about 10 to about 50 or more times than the amount of catalytic metal. Typically, a catalytic metal such as palladium may range in concentrations of from about 140 ppm to about 150 ppm in the colloid bath. Such catalysts are commercially available. U.S. Pat. No. 3,011,920 to Shipley, Jr. discloses methods of making such catalysts, the disclosure of which is hereby incorporated in its entirety herein by reference. Also, U.S. Pat. Nos. 4,020,009 and 4,085,066 both to Gulla and assigned to Shipley Company, Inc. disclose catalytic metal colloids and methods of making the same, the disclosures of which are hereby incorporated in their entireties herein by reference.

Prior to electroless metal deposition on a substrate, such as a printed circuit board, the part of the substrate to be plated is immersed in a colloidal bath or solution. The substrate is then rinsed with water and then placed in an electroless bath for plating. About 70% or more of the catalyst consumed by the substrate during immersion is washed off of the substrate by the rinse. Thus, about 30% or less of the catalyst remains on the substrate. The catalytic metal colloids represent a major cost in electroless metal deposition. Thus, recovering the catalytic metal colloids for reuse is highly desirable. However, recovery of the catalytic metal from the rinse is difficult because the catalytic metal is in small concentrations and the non-catalytic metal, such as tin, is present in large concentrations. Thus, the rinse is often discarded with the loss of the valuable catalytic metal.

In addition to the loss of catalytic metal from rinses, catalytic metals also may be lost from the catalytic metal colloidal solutions or baths. For example, when employing copper clad substrates, such as printed circuit boards, which are drilled to provide through-holes, the through-holes are metal plated to provide a continuous current path when individual boards are joined together. Because the exposed surfaces in the holes are non-metallic, electroless plating techniques including the step of catalyzing by means of a catalytic metal colloid, such as tin/palladium colloid catalyst, is employed. Copper clad boards are immersed in the catalytic bath to deposit the catalyst thereon. Copper from the copper clad boards contaminates the catalytic metal colloidal bath with continued use of the bath. When the contamination reaches an extent such that the bath becomes ineffective or the electroless plating becomes less adherent than desirable, the bath is "spent" and is then discarded as waste.

Because many of the metals employed in the catalytic metal colloids are costly, especially gold, platinum and palladium, industries, such as the printed circuit board industry, would prefer to recover the metals rather than dispose of them. Recovery of the metals would reduce manufacturing costs to manufacturers of printed circuit boards and reduce costs to the manufacturers' customers. Also, the catalytic metals present a hazard to the environment, and disposal of the metals is strictly regulated by the Federal and State governments. Often large volumes of liquid waste are transported far distances to designated sites for proper disposal. Thus, proper disposal procedures for the metals are costly to the industry and much of the cost is passed onto the customer. Although recovery of catalytic metals from catalytic metal colloids is highly desirable, an economically efficient method for the recovery of the catalytic metal from colloids has not been developed. Accordingly, there is a need for an economically and environmentally safe method for recovering catalytic metals from colloidal metal catalysts.

A few attempts have been made to recover catalytic metals from waste solutions. U.S. Pat. No. 4,435,258 to Milka, Jr. et al. and assigned to Western Electric Co., Inc. discloses a method of recovering palladium from spent electroless catalytic baths employing an electrolytic cell. The method of recovery disclosed in the '258 patent involves (a) dissolving tin/palladium colloid in a spent catalytic bath with an oxidizing agent such as hydrogen peroxide to form a true solution; (b) heating the bath to a temperature and for a time sufficient to essentially remove excess hydrogen peroxide; (c) placing the solution in an electrolytic cell having (1) a nickel anode, and (2) a cathode composed of a metal or metallic surface, such as copper or nickel, for the palladium to be deposited; and (d) electrodeposition of palladium from the solution onto the cathode at a voltage that allegedly tends to minimize and substantially reduce tin deposits. There are many disadvantages with such a method. Electrolytic cells can be costly. The consumer of the palladium colloid either has to invest in purchasing such electrolytic cells, or pay the cost of transporting the spent catalytic bath to a site where the electrolytic cell is located. Because of the weight of fluids, the cost of transporting the bath to the recovery site is expensive. If the consumer purchases the electrolytic cell, then the consumer must expend funds in both operating and maintaining the cell. Such an electrolytic cell as described in the '258 patent is specially designed and replacement of worn parts may not be inexpensive or readily obtainable. For example, the electrolytic cell of the '258 patent has a specially designed cascading structure to allegedly prevent deposited palladium from breaking away from the cathode. Also, a high purity nickel anode and cathode are recommended to obtain acceptable recovery amounts of palladium. Such adds to the cost of the apparatus. Amounts of palladium recovered also depend on the amounts of specific components in the colloidal bath as well as any contaminants. The more dilute the palladium and the more contaminants in the bath the more difficult the recovery of the palladium. Such contaminants as copper salts or other metal contaminants may compete for deposition at the electrodes with the palladium. Several palladium colloidal catalysts are obtainable from commercial sources and the specific components and purity vary. Thus, the efficiency of such electrolytic cells may vary. Another problem associated with such electrolytic cells is duration of operation. High recovery of palladium by an electrolytic cell often requires many hours of operation. Such long hours of operation increase the cost of recovering catalytic metal and add wear to the electrolytic cell.

Research Disclosure 31448 (anonymous, June 1990) entitled "Reclamation of Palladium from Colloidal Seeder Solutions" discloses a method of recovering palladium from colloidal tin/palladium solutions used to promote electroless metal depositions. The palladium is recovered by flocculating the colloid by rapid mixing with air or oxygen. The oxygen allegedly does not oxidize the palladium. A palladium rich precipitate is allegedly obtained. The precipitate is dried and further processed. The document is silent on the further processing of the precipitate to recover the palladium as well as the efficiency of the disclosed method. The document only mentions that the method is intended to eliminate costly trucking of the hazardous waste from the colloidal solutions.

U.S. Pat. No. 5,302,183 to De Boer et al. and assigned to Shell Oil Company discloses a method of recovering precious metals such as platinum and palladium from non-aqueous effluents in colloidal and/or dissolved states. Such effluents are from non-aqueous effluents leaving flow-through reactors or bleed streams from a stripping reactor, not from aqueous solutions of colloidal catalysts or aqueous rinses as employed in the circuit board industry. The non-aqueous colloidal metal and/or dissolved metal effluents may be initially distilled to remove unwanted reaction product in the effluent. The non-aqueous effluent also may be dried to remove any water or the effluent may be filtered. The patent is silent on the specific method or efficiency of the filtering method. If the aforementioned steps are eliminated, the non-aqueous effluent may be immediately reduced with a reducing agent. The reducing agent is added to the non-aqueous effluent to complete reduction of any cationic precious metals present in the non-aqueous effluent. Suitable reduction agents are carbon monoxide and lower olefins such as ethylene. The reducing agents are contacted with the non-aqueous effluent in a gaseous state.

After reduction, the reduced precious metal is deposited on a support such as activated carbon or porous granular plastic or resin. The reduced precious metal deposited on the support may be recovered by filtration, decanting, centrifugation or the support may be burned and the precious metal transported to the appropriate facilities for further processing.

Although the '183 patent alleges a high recovery of precious metal from the disclosed process, the process suffers from a number of disadvantages. First, the reducing step employs expensive technological equipment such as gas chambers to apply the reducing agent in gaseous form to the non-aqueous effluent. Such a step involves transporting the non-aqueous effluent to a facility having such equipment, or the purchase and maintenance of such equipment by the workers where the non-aqueous effluent is recovered. Additionally, trained workers are employed in the operation of the equipment used in the reducing step adding to the cost of the process. Thus, the reduction step is costly. Further, carbon monoxide is a preferred reducing gas. Carbon monoxide gas is very toxic and presents a hazard to workers performing the reduction process. The other reducing agent, i.e., the lower olefins, also may present a hazard to workers. For example, ethylene presents a serious flammability problem. Additionally, the '183 patent is limited to recovering precious metals only from non-aqueous effluents.

Adsorbents such as resins are known in the art to be used for recovering precious metals from aqueous solutions. A paper entitled "Extraction and Recovery of Precious metals from Plating solutions Using Molecular Recognition Technology" by S. R. Izatt et al. discloses the use of SuperLig® 127 resin for selectively recovering potassium gold cyanide from drag out rinse solutions, and SuperLig® 2 resin for recovering palladium metal from dipping baths. SuperLig® resins are proprietary crown ether resins obtainable from IBC Advanced Technologies Inc., of American Fork, Utah. A disadvantage in the method for recovering potassium gold cyanide by the method using SuperLig® 127 resin is that a concentrator with a vacuum and a heat exchanger is employed to concentrate the potassium gold cyanide from drag out rinse solutions to a concentration of 16 g/l. Such apparatus adds to the cost of the process. A disadvantage of both the potassium gold cyanide and the palladium recovery processes is the limiting of the recovery processes to the use of a specific proprietary resin. A worker practicing the method is restricted to using a specific proprietary resin without an alternative material for recovering the metals. Thus, the method is inflexible for the worker. Also, such resins are costly to manufacture and often require skilled workers to operate the resins and maintain them. Another problem with employing resins, in general, is that the resins may become fouled with salts, non-catalytic metals and undesirable precipitated solids during the recovery process. Thus, the resins have to be regenerated or replaced with new resins to continue the recovery process. The added step of regenerating the resins delays the recovery process. Also, some of the catalytic metal mixed with the materials that foul the resin may be lost during regeneration. Replacing the fouled resin with new resin adds to the cost of the recovery process. Accordingly, there is a need for a more economic and flexible method for recovering catalytic metals.

U.S. provisional patent application Ser. No. 60/262,592 filed Jan. 18, 2001 discloses an efficient method of recovering catalytic metals from solutions containing catalytic metal colloids. The method involves recovering catalytic metal colloids from solutions by capturing the colloids on a filter as a precipitate followed by washing the precipitate with an oxidizing agent until the catalytic metal is removed from the filter. The catalytic metal is recovered in a separate container and then collected on an adsorbent. The adsorbent is burned and the catalytic metal is retrieved. The filters used to collect the catalytic metal colloid are disposed of. Although the method provides an efficient means of recovering catalytic metal, there is still a need for an improved method.

SUMMARY OF THE INVENTION

The present invention is directed to a method of recovering catalytic metals from a fluid containing catalytic metal colloids by concentrating the catalytic metal colloids as a precipitate on a porous metal filter followed by removing the precipitate from the porous metal filter by backwashing the filter with a fluid, solubilizing the precipitate, and then retrieving the catalytic metals.

Advantageously, the method of the present invention provides an economically efficient means of recovering catalytic metals for reuse. Filtering the catalytic metal colloid species from a fluid with a porous metal filter concentrates the catalytic metal colloid as a precipitate from many other components of the fluid that may interfere with catalytic metal recovery or increase both the time and expense for recovery. Such other components may be excess non-catalytic metal, salts, contaminants from the printed wiring boards, and the like.

Catalytic metal colloids are employed in metal deposition processes and compositions. Such metal deposition compositions include electrolytic and electroless solutions, i.e., solutions capable of the chemical deposition of an adherent metal coating on a conductive, non-conductive, or semi-conductive substrate in the absence of an external electric source. The part of the substrate to be plated with a metal is contacted with a catalytic metal colloid solution or bath to coat the substrate with the colloid. The catalytic metal colloid acts as a seeder for metal deposition on the substrate. The substrate may then be placed in a metal plating solution for metal deposition. The substrate may be rinsed a number of times during the process. Some of the catalytic colloid is carried away in the rinse. Such rinse solutions are also known as drag out baths. Because the catalytic metal colloids represent a major cost of operating metal deposition processes, recovering the catalytic metal is highly desirable. However, because the amount of catalytic metal in catalytic metal colloids is proportionately very small in relation to non-catalytic metal, workers in the industry have been discouraged from recovering the catalytic metal, or have not found a satisfactory method of recovering catalytic metals efficiently. The amount of non-catalytic metal in a colloid may be from about 10 to as much as about 50 times the amount of catalytic metal. Further, catalytic metal colloids are employed in solutions in very dilute amounts. Thus, recovering catalytic metals from such dilute solutions makes the task even more difficult, and in many instances economically inefficient. Continued loss of catalytic metals is costly to the industry.

Filtering solutions with a porous metal filter captures and concentrates catalytic metal colloids as a precipitate on the filter. The porous metal filter allows much of the excess soluble non-catalytic metal, plating metals, metal salts, complexing ions, reducing agents, alkali metal salts, pH adjusters, brighteners, stabilizers, and other components in the rinse solutions to pass through the filter. Thus, employing a porous metal filter in a filtering step provides a rapid and efficient means for concentrating and recovering catalytic metal colloids. Advantageously, porous metal filters concentrate catalytic metal colloids from dilute fluids or solutions as a precipitate such that most of the catalytic metal may be recovered. The precipitate may be removed from the porous metal filter by backwashing the filter with a fluid and the precipitate collected in a suitable container. The precipitate may then be solubilized and the catalytic metal collected on a suitable adsorbent. The adsorbent may then be burned and the catalytic metal collected.

The method of the present invention is highly desirable for any industry where catalytic metal colloids are employed. The printed circuit board industry, where catalytic metal colloids are employed in metal deposition processes, especially benefits from the recovery method of the present invention. Expensive catalytic metals in dilute concentrations may be readily recovered without added complex time consuming steps. Thus, the method of recovering catalytic metals using a porous metal filter is economically efficient.

Additionally, the method of the present invention is environmentally friendly. The method of the present invention provides a high recovery of catalytic metals that are potentially hazardous to the environment. Also, the filtered catalytic metal colloids may be transported to another site for further processing without the expense or danger of spillage as with large volumes of hazardous fluid.

A primary objective of the present invention is to provide a method for recovering catalytic metals from fluids containing catalytic metal colloids using a porous metal filter.

Another objective of the present invention is to provide a method of recovering catalytic metals from a catalytic metal colloid solution by an economically efficient means.

A further objective of the present invention is to provide a method for recovering catalytic metals from a catalytic metal colloid solution that is environmentally friendly.

Additional objectives and advantages of the present invention may be ascertained by those of skill in the art by reading the detailed description of the invention and the appended claims.

DETAILED DESCRIPTION OF THE INVENTION

Figure 1:
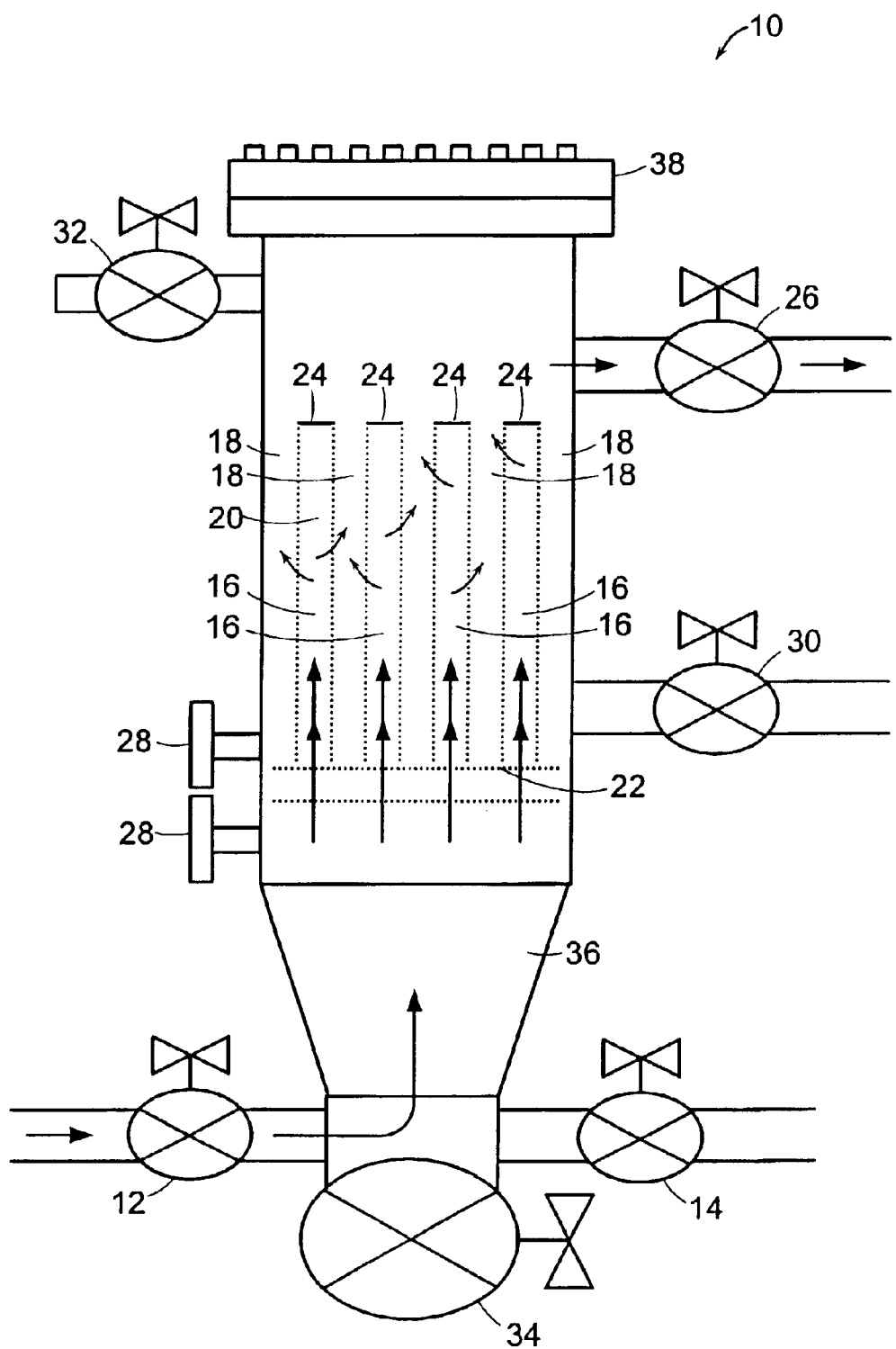
FIG. 1 is a cross section of an apparatus with a porous metal filter that may be employed to practice the present invention.

The present invention is directed to a method of recovering catalytic metals from fluids containing catalytic metal colloids in dilute amounts using a porous metal filter. Fluids or solutions containing catalytic metal colloids are contacted with a porous metal filter that captures and concentrates the catalytic metal colloids as a precipitate. Porous metal filters of the present invention capture and concentrate greater than 90% by weight of catalytic metal colloids from solutions. Porous metal filtering provides a rapid and efficient means of recovering dilute concentrations of catalytic metal colloids from fluids. Much of the precipitated solids are composed of catalytic metal and non-catalytic metal that composes the colloid. Other components in the fluid or solution pass through the filter leaving the catalytic metal colloids as a precipitate concentrated on the filter. After the catalytic metal colloids are entrapped on the porous metal filter, the porous metal filter is backwashed with a fluid to remove the precipitate from the filter. Fluids for backwashing include any suitable liquid, gas, or combination thereof. Backwashed precipitate or catalytic metal colloid is collected in a suitable container as a concentrated slurry or precipitate. The concentrated slurry, or precipitate of catalytic colloid may then be solubilized with a suitable solubilizing agent. The solubilizing agent puts the catalytic metals and non-catalytic metals of the colloid in solution, and the catalytic metal may be recovered with a selective adsorbent. The catalytic metals may then be removed from the adsorbent by known methods in the art such as burning the adsorbent to retrieve the catalytic metal followed by smelting, or eluting the adsorbent with a suitable buffer to remove the palladium.

Advantageously, employing porous metal filters to capture and concentrate catalytic metal colloids eliminates oxidizing steps to remove catalytic metal from filters. Elimination of oxidizing steps prevents the potentially unsafe practice of repeatedly stripping filters with oxidizing mixtures of, for example, hydrochloric acid and hydrogen peroxide. Since the concentrated precipitate may be removed from the porous metal filter by backwashing, replacement filters are not needed after a filter becomes filled with precipitate. Further, the method of the present invention does not employ incineration of filters to retrieve catalytic metals. Thus, the expense of filter replacement is reduced providing for a more cost efficient method. Generally, catalytic metal recovery using the method of the present invention is greater than 90% by weight of the catalytic metal from the fluid. Catalytic metal recovery from the method of the present invention may be greater than 95% by weight. The method of the present invention may even achieve catalytic metal recovery of as high as from about 98% by weight to about 100% by weight.

Other advantages of using a porous metal filter to collect and concentrate catalytic metal colloids include a uniform, high precision porosity. In other words, the porous metal filter has a uniform pore size and pore distribution, or distinct porosity characteristics that are not altered during filtration. In contrast many disposable non-metal filters have variations in pore size and uniformity because of the pliable material of which they are made. Also, disposable non-metal filters may fatigue and tear during filtration resulting in both loss of catalytic metal, and repeated attempts at filtration to try and recover lost catalytic metal, thus reducing the efficiency of catalytic metal recovery. Porous metal filters have sintered bonds that hold the metal filter together without concern for fatigue and tearing. Additionally, porous metal filter differential pressure (terminal pressure) may range from about 40 psi to as high as about 125 psi for more efficient filtration and concentration of catalytic metal colloids. (psi=pounds per square inch.) Preferably, the differential pressure (terminal pressure) ranges from about 60 psi to about 100 psi. Such a preferred differential pressure range provides for a more efficient catalytic colloid filtration from dilute solutions. Non-metal filters may readily tear when such high pressures are applied in filtration. Because porous metal filters may be repeatedly used without replacement, and precipitated catalytic metal colloids may be removed from the porous metal filter without burning or wasting the filter, catalytic metal recovery is more efficient, and environmentally sound. Disposing of filter waste or ash in land fills is eliminated.

Any suitable porous metal filter with a particle retention rating of from about 0.2 microns to about 20 microns may be employed to recover catalytic metal colloids. Preferably, particle retention rating ranges from about 1 micron to about 10 microns. Suitable porous metal filters that may be used to practice the present invention include, but are not limited to, porous metal filters manufactured from metal foams, ceramic foams, and aerogel foams, or powders. Powders are preferred for the filters of the present inventions. An example of a suitable metal foam is a pliable or ductile nickel foam of the type sold by INCO under Incofoam® (available from INCO, Sudbury, Ontario, Canada). Examples of powders include nickel powders, stainless steel powders, titanium powders, zirconium powders, and the like. A suitable nickel powder includes Inco® T210 (available from INCO). Other examples of suitable metals include, 304L, 310, 316L, 347 and 430 stainless steel (available from Mott Corporation), Hastelloy® B, B-2, C-22, C-276, N and X, (available from Haynes International), Inconel® 600, 625 and 690 (available from INCO, Sudbury, Ontario Canada), Monel® 400, (available from BPW-Brown Pacific Wire), Nickel® 200 (available from Special Metals Corporation), and Alloy® 20 (available from Carpenter Technology). Examples of suitable filters are disclosed in U.S. Pat. Nos. 6,080,219; 5,937,263; 5,917,066; and 5,114,447 the disclosures of which are hereby incorporated herein in their entireties by reference. Such filters may be employed in any suitable apparatus capable of backwashing catalytic metal colloids from the filter into a solids collection container.

Catalytic metal colloids are dispersions of catalytic metal ions in combination with non-catalytic metal ions in excess of the catalytic metal ions. The non-catalytic metal ions reduce the catalytic metal ions and a dispersion of solid particles is formed in solution. Such solutions may be aqueous or non-aqueous. Such catalytic metal colloids are well known in the art. Catalytic metals include, but are not limited to, copper, beryllium, aluminum, tungsten, tellurium, nickel, gold, platinum, palladium, silver, germanium, molybdenum, selenium, rhodium, osmium, iridium, ruthenium, lead and magnesium. Preferred metal catalysts are the noble metals such as gold, platinum and palladium with palladium the most preferred. Non-catalytic metals admixed in excess with the catalytic metals include, but are not limited to, stannous ions. Such non-catalytic metal is employed in the catalytic metal colloid in amounts from about 10 to about 50 times greater than the amount of catalytic metal. Sometimes the amount of non-catalytic metal exceeds 50 times the amount of catalytic metal in the colloid. Preferred colloidal catalysts are tin/palladium, tin/platinum and tin/gold with tin/palladium the most preferred. U.S. Pat. Nos. 3,011,920; 4,020,009; and 4,085,066 disclose a number of catalytic metal colloids and methods of making them, the disclosures of which are hereby incorporated herein in their entirety by reference.

Any suitable porous metal filter as described above may be employed to filter the catalytic metal colloid particles from a fluid or solution as long as the porous metal filter entraps and concentrates the catalytic metal colloids, and allows other components in the solution to pass through the porous metal filter, or the other components are at least easier to remove from the porous metal filter than the catalytic metal colloids. Surprisingly, catalytic metal colloids adhere to a wide variety of metals allowing the catalytic metal colloids to be entrapped and concentrated on the porous metal filter while allowing unwanted components to pass through the pores of the metal filter. Such unwanted components are components that can interfere with the efficient and optimum recovery of the catalytic metal. Materials that are in solution and that pass through the filter include, but are not limited to, plating metals such as copper, nickel and the like; reducing agents such as formaldehyde or sodium hypophosphite; alkali metal salts such as sodium and potassium salts; soluble non-catalytic metal; complexing agents such as primary, secondary, tertiary, quaternary amines, various carboxylic acids and various amino acids; pH adjusters such as sodium carbonate, sodium bicarbonate, sodium hydroxide, ammonium hydroxide and acetic acid; brighteners; and stabilizers or surfactants. Such metals, salts and various other materials compose a greater part of solutions from which the catalytic metals are recovered. Thus, the materials remaining on the filter as a precipitate are predominantly catalytic metal colloids. The catalytic metals compose from about 0.0001% by weight or less to about 0.05% by weight of such solutions. Such dilute solutions include, but are not limited to, rinse solutions or dragout baths collected from substrates treated with catalytic metal colloid baths, or any solution, especially an aqueous solution, containing catalytic metal colloids.

For example the part of the substrate to be plated with a metal is contacted with a catalytic metal colloid solution or bath to coat the substrate with the colloid. Suitable substrates, include, but are not limited, printed circuit or wiring boards. The catalytic metal colloid bath seeds the substrate with the catalytic metal colloid for electroless plating. Such solutions may contain a catalytic metal chloride such as palladium chloride; stannous chloride; and hydrochloric acid to acidify the solution and the balance water. Examples of other components of catalytic metal colloid baths include sodium stannate; platinum chloride; gold chloride; formaldehyde; sodium chloride; sodium citrate; and sodium hydroxide. Such baths are high in concentrations of stannous and stannate ions, and sodium and chloride ions in contrast to the amount of catalytic metal. Such ions may comprise from about 15% to about 30% by weight of the bath with much of the remaining weight water. The baths may be acidic or alkaline. The pH of the bath may range from about 1.0 to about 9.0. After the substrate is contacted with the catalytic metal colloid solution, the substrate is rinsed with water and the rinse or drag out bath is collected for filtering. The rinse from the substrate contains many of the components included in the bath in addition to the catalytic metal colloid and some catalytic metal not associated with the colloid. The catalytic metal colloid is recovered by filtering the rinse to entrap and concentrate the catalytic metal colloid and any catalytic metal as a precipitate on the filter. The precipitate contains predominantly catalytic metal and non-catalytic metal ions of which the colloid is composed. For example, when the colloid is Sn/Pd, the precipitate is predominantly composed of palladium metal, i.e., $Pd^°$, and $Sn^{2+}$ with some $Sn^{4+}$. The catalytic metal colloid surprisingly has a high affinity for the porous metal filter. Palladium metal in such dilute solutions ranges, for example, from about 1 ppm to about 8 ppm. The other components from the rinse do not have as high an affinity for the filter and most of the other components pass through. The porous metal filter with the entrapped catalytic metal colloid may be rinsed with water to remove any unwanted bath components that may be retained on the filter such as surfactants and the like as well as excess stannous ions.

FIG. 1 is a schematic of a filter apparatus that may be employed to practice the present invention. Apparatus 10 has liquid inlet valve 12 that allows fluids from a drag out bath or waste solution working tank (not shown) to enter space 36 of apparatus 10 for filtration. Liquid drain valve 14 remains closed during filtration. The solution to be filtered is removed from the working tank and pumped through liquid inlet valve 12 by means of a mechanical pump (not shown). Arrows illustrate the flow of the solution through apparatus 10. Solution is pumped into cavities 16 of porous metal filter elements 18. While the solution passes through porous metal filter elements 18, catalytic metal colloid is deposited as a precipitate (not shown) on the inside surfaces 20. Filter elements 18 are joined together with tubesheet 22. Each filter element is capped with end cap 24. The solution exits apparatus 10 through upper outlet 26 to ensure that the full area of filter elements 18 is utilized. When pressure gages 28 achieve a terminal pressure of from about 60 psi to about 100 psi, apparatus 10 is ready for an empty shell backwashing. The pump is turned off before backwashing. Liquid inlet valve 12 and upper outlet valve 26 are closed. Lower outlet valve 30 is opened to allow the solution remaining in apparatus 10 to drain. After the solution has stopped draining lower outlet valve 30 is closed. A small amount of liquid may remain at the bottom of the apparatus. Gas inlet valve 32 is opened and gas from a gas source (not shown) is allowed to build pressure at top 38 of apparatus 10 for a few seconds. Solids drain valve 34 is opened and pressure from the gas forces the precipitate off of the inside surfaces 20 of filter elements 18 and down through solids drain valve 34 and into a solids collection container (not shown). Solids discharge is sometimes repeated in succession to ensure that all of the solids are removed from filter elements 18. Once the backwash is completed, gas inlet valve 32 is closed, solids drain valve 34 is closed, upper outlet valve 26 is opened, liquid inlet valve 12 is opened, the pump is turned on and the filter cycle begins again. Periodically a full shell backwash is performed. A fill shell backwash is identical to the empty shell backwash except lower outlet valve 30 is not opened to drain apparatus 10. Apparatus 10 remains full of liquid during the full shell backwash. If for any reason apparatus 10 has to be completely drained of solution apart from backwashing, liquid drain valve 14 is used to drain the solution.

Figure 2:
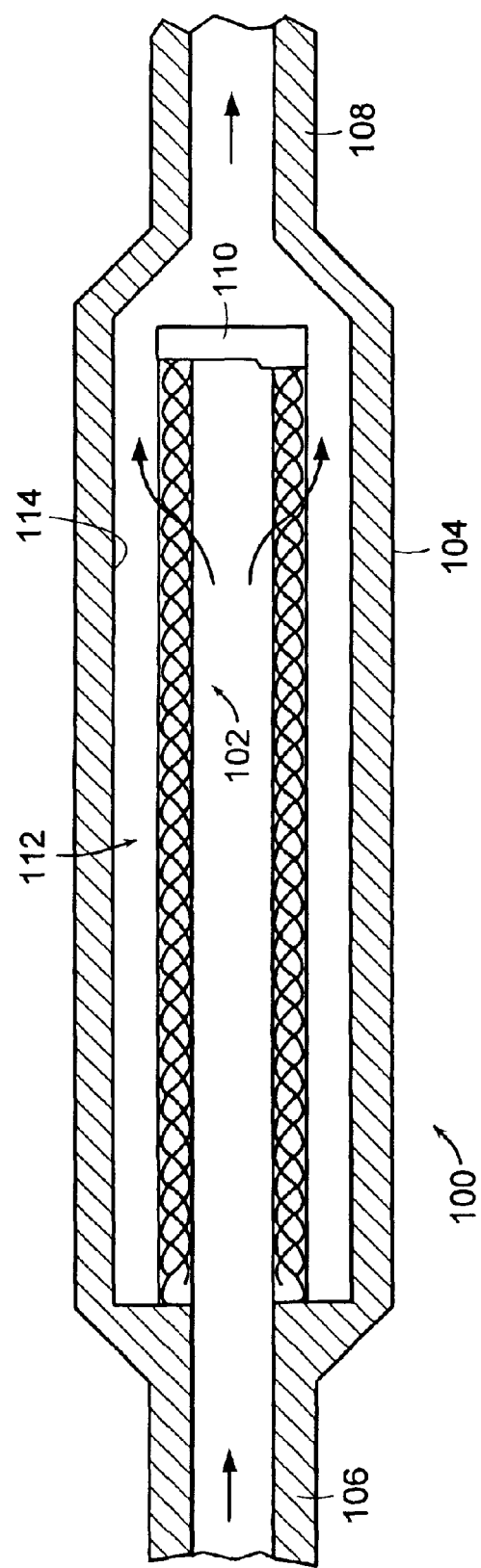
FIG. 2 is a cross section of a filter including a porous metal filter element that may be employed to practice the present invention.

FIG. 2 illustrates a filter 100, including a porous metal tubular filtration element 102 mounted in housing 104. One end of filtration element 102 is welded to the end of housing 104 adjacent inlet 106. The other end of filtration element 102 is spaced from the end of housing 104 adjacent outlet 108 and is closed by endcap 110. An annular cavity 112 surrounds filtration element 104 within cylindrical wall 114 of the tubular element into annular cavity 112 and then exits the filter through outlet 108. Porous metal tubular filtration element 102 contains a metal foam with pores that are filled with sintered metal powder such as nickel.

After the precipitate is collected, usually as a slurry or solid wet precipitate or cake, an oxidizing agent is added to oxidize catalytic metal to catalytic metal ions for easier recovery from the slurry or solid wet precipitate. For example, when a tin/palladium colloid is recovered, an oxidizing agent is used to oxidize palladium metal ($Pd°$) to palladium ions ($Pd^{2+}$) for easier recovery from the slurry or solid wet precipitate that also contains unwanted tin ions. A sufficient amount of oxidizing agent to solubilize the precipitated colloid is employed. One suitable oxidizing agent is a mixture of HCl and hydrogen peroxide. Such mixtures may be about 50:50 by weight mixture. Preferably, about 1 M to about 10 M HCl is used. Preferably, about 0.5% by weight to about 4% by weight $H_2O_2$ (about 35% by volume) is employed. Catalytic metal ions may then be recovered from the solution by any suitable method in the art. For example, the catalytic metal ions may be retrieved by employing materials that selectively adsorb the catalytic metal ions. Examples of such adsorbents include activated carbon, silica gel, alumina, silica-alumina, silicon carbide and zirconium silicate. Diatomacious earth and pumice and the like also can be employed. Resins such as styrenic-based resins, acrylic based resins, crown ethers and the like also may be employed. Examples of suitable resins that may be obtained commercially are the Amborane® resins such as Amborane® 345 and 355; Amberlite® resins such as Amberlite® IRA-75 and IRA-400, and Ambersorb® (all obtainable from Shipley Company, Marlborough, Mass.). The different adsorbents may be employed individually or in combination.

Examples of suitable resins include, but are not limited to, nonionic borane reducing resins. Such resins may be acrylic based amine-borane reducing resins, polystyrene based amine-borane reducing resins, acrylic based phosphine-borane reducing resins, or polystyrene based phosphine-borane reducing resins. Such resins and methods of making the same are disclosed in U.S. Pat. Nos. 4,240,909; 4,223,173; 4,311,812; 4,311,811; 4,355,140; and 4,410,665 all assigned to Rohm and Haas Company, the disclosures of which are hereby incorporated herein in their entireties by reference.

Examples of suitable crown ethers include, but are not limited to, lipophilic thiacrown ethers such as 2-octyl-1,4,7-trithiacyclononane; 2-octyl-1,4,7-trithiacyclodecane; 2-octyl-1,4,7,10-tetrathiacyclododecane; 6-octyl-1,4,8,11-tetrathiacyclotetradecane; 3-octyl-1,5,9,13-tetrathiacyclohexadecane; 2,11-dioctyl-1,4,7,10,13,16-hexathiacyclooctadecane; 2,15-dioctyl-1,4,7,10,13,16-hexathiacyclooctadecane and the like. Such lipophilic thiacrown ethers are disclosed in "Lipophilic Polythiamacrocycles as Palladium Extracting Agents", by Guyon et al., Tetrahedron, Vol. 51, No. 14, pp. 4065–4074, 1995. Also, thiacrown ether carboxylic acids may be employed. Examples of such thiacrown ether carboxylic acids include, but are not limited to, 3,6,10,13-tetrathiacyclotetradec-1-oxyacetic acid (TTCTOAA); and 2-(3,6,10,13-tetrathiacyclotetracec-1-oxy)hexano acid (TTCTOHA). The synthesis of such ethers is disclosed in "Synthesis of Thiacrown Ether Carboxylic Acids and Their Characteristics as Extractants for Metal Ions", Saito et al., Analytica Chimica Acta, 299, pp. 137–144, 1994. Other suitable thiacrown ether compounds that may be employed to filter catalytic metal colloids include, but are not limited to, thiacrown polyacrylamide, thiacrown polyacrylic acid, thiacrown polyhydroxypropylacrylate and the like. Such polymeric thiacrowns are disclosed in U.S. Pat. No. 6,147,225 to Gaboury et al. and assigned to Betzdearborn Inc., the entire disclosure of which is hereby incorporated herein by reference.

Other crown ethers that may be employed include the chiral crown ethers such as the optically active isomers of bis (12-crown-4 methyl)dialkyl malonates. Such crown ethers are disclosed in U.S. Pat. No. 5,047,563 to Denton et al. and assigned to Miles Inc., the entire disclosure of which is hereby incorporated herein by reference. Diaza crown ethers such as diaza-18-crown-6-ether (DA18C6) also may be employed. The diaza crown ethers and the methods of making the same are disclosed in U.S. Pat. No. 5,247,078 to Champion et al. and assigned to Texaco Chemical Company, the entire disclosure of which is hereby incorporated herein by reference. When ethers are employed, they are preferably bonded to a solid support such as a polystyrene or silica gel support.

Advantageously, the catalytic metal colloids concentrated on the filter may be completely processed and retrieved at the site of dragout recovery, or economically and safely transported to another site for further processing. Transportation to another site for subsequent recovery no longer involves moving large volumes of fluids to distant sites. Thus, the chances of polluting the environment with hazardous waste due to spills are eliminated. Also the cost of transport is less because less weight is involved and more of the catalytic metal colloid can be transported in one load because the colloid is in concentrated form.

The various resins such as the crown ethers and the nonionic borane reducing resins described above are suitable for adsorbing many catalytic metal ions, especially the noble metal ions of gold, platinum and palladium. Examples of commercially available nonionic borane reducing resins are the Amborane® resins. Examples of commercially available crown ethers are the SuperLig® resins (obtainable from IBC Advanced Technologies Inc., American Fork, Utah). Preferred resins for recovering the catalytic metal ions are the nonionic acrylic based amine-borane reducing resins and the nonionic acrylic based phosphine-borane reducing resins. Such resins are preferred for recovering precious metals such as gold, rhodium, platinum and palladium ions, especially palladium ions, because the resins selectively reduce the precious metals. Advantageously, because salts are separated from the catalytic metal colloids during the solids filtration step, less nonionic borane reducing resin can be employed in recovering the catalytic metal ions. Salts, especially salts containing chloride ions, cause the nonionic borane resins to collapse. The collapse of the resins reduces the ability of the resins to reduce and bind the metal ions. Thus, when solutions having significant quantities of salt are contacted with the resin, excess resin is employed to avoid the loss of catalytic metal ions. Because the method of the present invention removes the salts, the amount of resin employed may be reduced from about 10% to about 40% of the amount that metal ion recovery requires with a salt containing composition. In addition to the improved efficiency of using less resin for recovery, the cost of performing the recovery with such resins is reduced. The nonionic acrylic based amine-borane and phospine-borane reducing resins are costly. Thus, the method of the present invention is a more economically efficient method of employing such preferred resins.

The catalytic metals may be retrieved from the adsorbent by any suitable means and optionally further processed by known methods in the art. For example, catalytic metals on the nonionic borane reducing resins, may be retrieved by burning the resins. The burnt material may be sent to be smelted to recover the catalytic metal. Smelting methods are well known in the art. An alternative method involves eluting the catalytic metal ions from an adsorbent using a suitable buffer to yield a catalytic metal ion solution. An example of such a buffer is ammonium hydroxide. Generally, the method of the present invention recovers greater than 90% by weight of the initial catalytic metal in the fluid. Filters of the method of the present invention may have a recovery of greater than 95% by weight of the catalytic metal in the fluid. The method of the present invention may achieve catalytic metal recovery as high as about 98% by weight to about 100% by weight. The expression "about 100% by weight" includes 99.0% to 100% by weight.

Although the present invention is described with an emphasis on recovering catalytic metal from aqueous solutions containing catalytic metal colloids in the printed circuit and wiring board industry, other industries that desire to recover catalytic metal from fluid wastes or dragout solutions containing catalytic metal colloids also may employ the method of the present invention.

The following example is intended to further illustrate the present invention and is not intended to limit the scope of the invention.

EXAMPLE

A tin/palladium colloid was recovered from a 25 gallon (95 liters) aqueous dragout bath having the composition described below. All percentages are by weight.
1. 0.6% Sodium Bisulfate ($NaHSO_4$)
2. 0.05% Carbamic Acid
3. 3.8% Chloride Compounds
4. 0.0025% Palladium Chloride
5. 0.083% Stannous Chloride
6. 95% Deionized Water When all of the above components were combined in the deionized water, a precipitate of tin/palladium colloid formed. The weight ratio of tin (stannous and stannic ions) to palladium was about 33:1. The dragout bath was filtered in a continuous mode using a porous metal filtration element composed of stainless steel with a particle retention rating of about 0.2 microns. The filter apparatus employed was similar to that shown in FIG. 1. Each filter element was about 1.5 inches in diameter with a length of about 12 inches (2.54 cm/inch). Each filter element was composed of porous nickel made from a nickel powder. The concentration of palladium metal (as tin/palladium colloid) was about 4 ppm. The rinse solution was pumped through the filter element with an initial pump pressure of about 85 psi. The flow rate at this pressure was about 270 mls/min and the inlet pump pressure was between about 44 psi to about 74 psi. The solution exiting the upper outlet valve was extremely clear and the palladium in the solution after filtration as measured by atomic absorption was about 0.01 ppm. The rinse solution continued to be pumped through the filter element with adjustments being made to the pump pressure in order to maintain a consistent output flow. After about 1 hour, the pump was increased to about 100 psi and the output flow was about 305 mls/min with an inlet pump pressure of about 55 to about 86 psi. After about 2 hours from the initiation of the testing the pump pressure was increased to about 110 psi and the output flow was about 300 mls/min with an inlet pump pressure (preferred terminal pressure) of from about 62 psi to about 98 psi. Again the solution exiting the upper outlet valve was measured by atomic absorption and the concentration of palladium was about 0.01 ppm. After this last measurement, the filter housing was prepared for an empty shell backwash.

The pump was turned off. The liquid inlet valve was closed. The upper outlet valve was closed. The lower outlet valve was opened to drain the filter housing of the liquid remaining inside the housing. After the liquid stopped coming out of the lower outlet valve, the lower outlet valve was closed. A small amount of liquid still remained in the bottom of the housing. The gas inlet was opened and compressed air at a pressure of about 30 psi entered the filter housing. The air was allowed to build up pressure in the filter housing for about 5 seconds. After about 5 seconds the solids drain valve was opened and the solids captured on the inside of the filter element were forced off of the filter element, through the solids drain valve and into a solids collection container. After the backwash was complete, the solids drain valve was closed, the gas inlet valve was closed, the liquid inlet valve was opened, the upper outlet valve was opened and the pump was turned on to resume the filter cycle. After backwashing the filter element and restarting the filter cycle, all the initial pressures and flows were achieved. Thus, all the solids that were captured by the filter element were removed during the backwash cycle.

The volume of the discharge was about 830 milliliters and the volume of the solids in the discharge was about 120 milliliters. The solids were decanted into a beaker and dried in a conventional convection oven at about 100° C. until dry. The weight of the solids was about 8.3 grams. The solid material contained mostly palladium metal ($Pd°$), $Sn^{2+}$ and some $Sn^{4+}$. The solid material was then dissolved with a sufficient amount of about 50/50 by weight of about 6 M HCl/about 1% hydrogen peroxide oxidizing agent (about 35% by volume $H_2O_2$). The oxidizing agent oxidized most of the $Pd°$ to $Pd^{2+}$ ions. The palladium ions were extracted from the solution with a crown ether, and the $Pd^{2+}$ ions were eluted from the crown ether with a buffer of ammonium hydroxide. About 98% by weight of the palladium metal from the tin/palladium colloid in the 25 gallon dragout bath was recovered. The amount of palladium metal retrieved was determined using atomic absorption spectroscopy. Thus, the method of the present invention provides an efficient means of recovering palladium metal from a dragout bath.

What is claimed is:

1. A method of recovering a catalytic metal from a catalytic metal colloid containing composition comprising:
    a) rinsing a substrate of catalytic metal colloid to form a composition comprising catalytic metal colloid; then
    b) passing the composition comprising the catalytic metal colloid through a filter to concentrate the catalytic metal colloid on the filter; then
    c) removing the catalytic metal of the catalytic metal colloid from the filter with an oxidizer; and then
    d) collecting the catalytic metal.

2. The method of claim 1, wherein greater than 90% by weight of the catalytic metal is recovered from the fluid.

3. The method of claim 1, wherein the catalytic metal comprises copper, beryllium, aluminum, tungsten, tellurium, nickel, silver, germanium, molybdenum, selenium, rhodium, osmium, iridium, ruthenium, lead, magnesium, gold, platinum, palladium, or mixtures thereof.

4. The method of claim 3, wherein the catalytic metal comprises gold, rhodium, platinum or palladium.

5. The method of claim 1, wherein a source of the porous metal filter is a metal foam, a ceramic foam, an aerogel foam, or metal powder.

6. The method of claim 5, wherein the powder comprises stainless steel, nickel, titanium or zirconium.

7. The method of claim 1, wherein the fluid is an aqueous rinse or dragout bath from a printed circuit board.

8. The method of claim 1, wherein the catalytic metal comprises from about 0.0001% by weight to about 0.05% by weight of the fluid.

9. The method of claim 1, wherein the catalytic metal is retrieved from the solution with an adsorbent.

10. The method of claim 9, wherein the adsorbent comprises a nonionic acrylic based amine-borane reducing resin, a nonionic polystyrene based amine-borane resin, a nonionic acrylic based phosphine-borane resin, a nonionic polystyrene based phosphine-borane resin, a lipophilic thiacrown ether, a thiacrown ether carboxylic acid, thiacrown polyacrylamide, thiacrown polyacrylic acid, thiacrown polyhydroxypropylacrylate, chiral crown ethers, diaza crown ethers, or mixtures thereof.

11. The method of claim 9, wherein the adsorbent comprises activated carbon, alumina, silica-alumina, silicon carbide, zirconium silicate, diatomacious earth or silica gel.

12. The method of claim 1, wherein the catalytic metal colloid is solubilized with an oxidizing agent.

13. The method of claim 12, wherein the oxidizing agent comprises $HCl/H_2O_2$ mixture.

14. The method of claim 1, wherein a terminal pressure of the porous metal filter ranges from about 40 psi to about 125 psi.

15. The method of claim 14, wherein the terminal pressure of the porous metal filter ranges from about 60 psi to about 100 psi.

16. A method of recovering catalytic metal from a drag out bath comprising:
   a) concentrating catalytic metal colloids as a precipitate on a porous metal filter; then
   b) removing the precipitate from the porous metal filter by backwashing the precipitate with a fluid; then
   c) solubilizing the precipitate to form a solution; then
   d) contacting the solution with an adsorbent to retrieve catalytic metal ions on the adsorbent; and then
   e) retrieving the catalytic metal from the adsorbent by contacting the adsorbent with a buffer.

17. The method of claim 16, wherein the precipitate is solubilized with about a 50:50 by weight mixture of $HCl/H_2O_2$.

18. The method of claim 16, wherein the buffer comprises ammonium hydroxide.

* * * * *